Patented July 5, 1949

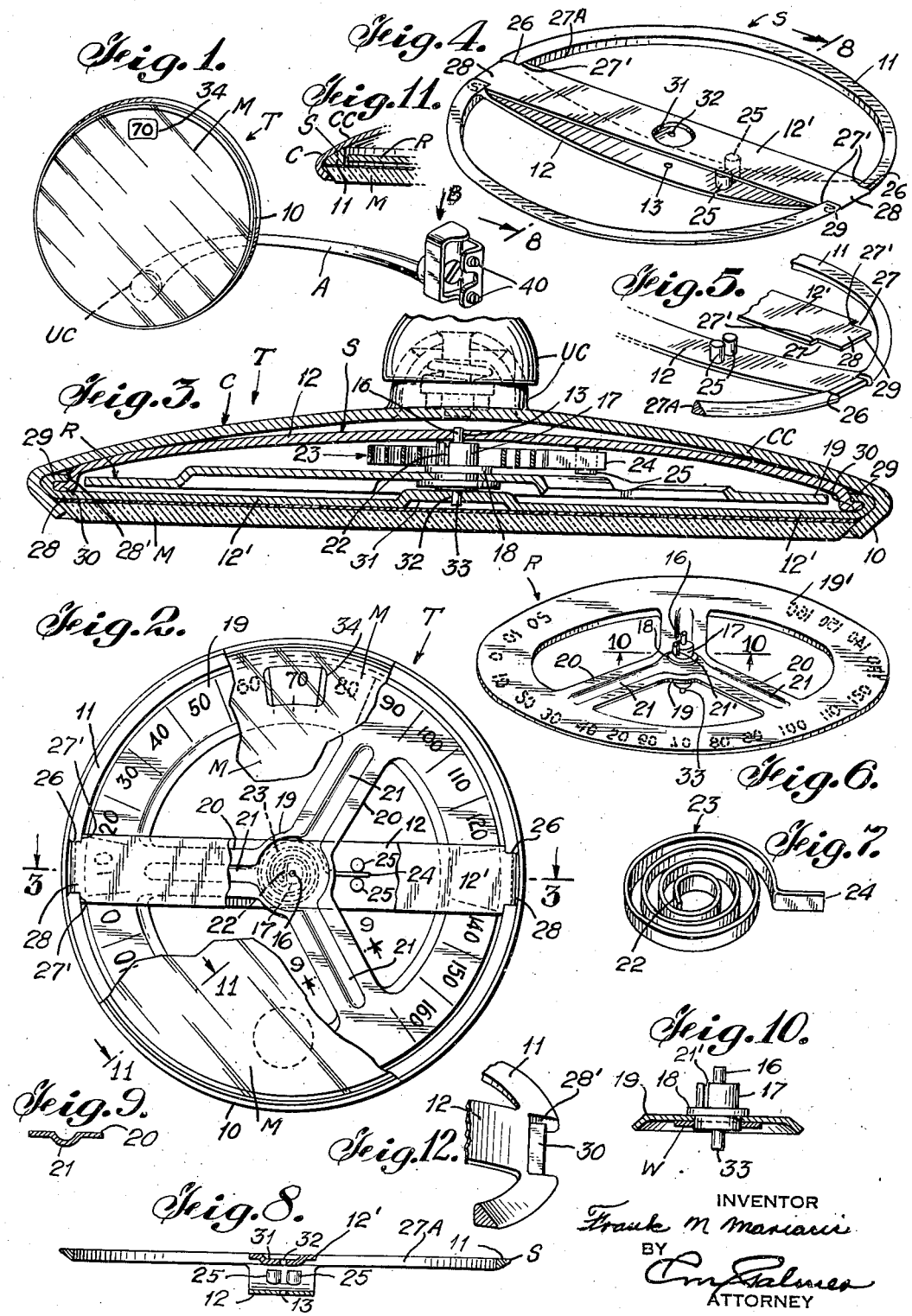

2,474,900

UNITED STATES PATENT OFFICE 2,474,900

MIRROR THERMOMETER

Frank N. Mariani, Washington Heights, N. Y.

Application December 9, 1948, Serial No. 64,380

10 Claims. (Cl. 73—367)

The invention deals with thermometers and specifically is concerned with a simplified thermometer utilizing a heat sensitive coil. One object of the invention is to provide an efficient thermometer of the character referred to particularly adapted for use in a rear vision reflector conveniently mounted on automotive devices although in the broadest aspect the invention is not limited in this respect. Specifically another salient and important object is realized in the provision of an appropriately retained annular stator having diametrically disposed bars constituting complementary bearing means for a shaft of a sensitively controlled rotor whereby the latter may be displaced in proportion to expansion or contraction of a heat sensitive coil having one end retained by the shaft and another end retained on one of the complementary bearing means. Another essential object is concerned in effectively utilizing the complementary bearings to prevent buckling of the stator. Other objects, advantages and features of the invention will be apparent from the following detailed specification taken with the accompanying drawings wherein:

Fig. 1 is an elevational view of the thermometer according to my invention and illustrating a swiveled arm connected thereto and adapted to be mounted on an automotive device.

Fig. 2 is a vertical view of the thermometer partly broken away to illustrate the interior construction.

Fig. 3 is an enlarged sectional view taken on the line 3—3 of Fig. 2.

Fig. 4 is a perspective view of the stator.

Fig. 5 is a fragmentary perspective view of the stator showing one of its complementary bearing means detached therefrom.

Fig. 6 is a perspective view of the indicia carrying rotor.

Fig. 7 is a perspective view of the heat sensitive coil.

Fig. 8 is a transverse sectional view on the line 8—8 of Fig. 4.

Fig. 9 is a sectional view on the line 9—9 of Fig. 2.

Fig. 10 is a sectional view on the line 10—10 of Fig. 6.

Fig. 11 is a sectional view on the line 11—11 of Fig. 2, and

Fig. 12 is an inverted perspective and detail view of the rotor.

The thermometer generally indicated T is characterized by the casing C embodying the rear circular convex concavo wall or backing CC and front annular retaining flange 10. The stator S is preferably die cast and comprises the annulus or rim 11 of triangular cross section and the diametrically disposed and relatively thin and arcuate strap 12 cast integral with rim 11. Strap 12 is provided with aperture 13 for rotatably guiding reduced portion 16 of stub shaft 17 having annular flange 18 serving as a stop for the hub 19 of the indicia carrying annular dial of the one piece rotor or spider R having radially extending arms 20 each of which may be provided with a suitable stiffening rib 21. Hub 19 is frictionally forced on shaft 17 and is further anchored thereon and against flange 18 by the washer W.

Stub shaft 17 is slotted at 21' for retaining the offset end 22 of the inner coil of the heat sensitive metal spiral spring 23 having its outer convolution provided with offset terminal 24 retained between the slightly spaced posts 25 cast integral with concavo-convex strap or bearing 12.

Ring or rim 11 of the stator S is interrupted on its front face by locating diametrically arranged gaps 26 for positioning walls or shoulders 27' of notches 27 of strap 12' against the inside annular surface 27A (Fig. 4) of ring 11 and reduced locking tongues 28 between the side walls of gaps 26, thereby locking the strap 12' against lengthwise and widthwise displacement and such relationship is retained when terminals 29 of the tongues 28 are firmly crimped in diametrically disposed recess 28' on the rear face of rim 11 and over and against the reduced web 30 of rim 11. It follows that not only is the outer strap or bearing 12' interlocked with ring 11 but is effectively anchored thereto against displacement.

If desired strap 12' may include boss 31 provided with aperture 32 in which reduced portion 33 of the stub shaft 17 is effectively journaled. Since stub shaft 17 rotates in the bearings of straps 12 and 12', changes of temperature causes spring 23 to wind or unwind thereby rotatably displacing rotor or interrupted disc R proportionately in response to the temperature changes. The extent of such rotary displacement may be registered in the transparent portion or window 34 in the disc shaped mirror or retaining member M which is held in place against ring or rim 11 of the stator S by the annular and inwardly turned flange 10 and by such arrangement ring 11 is fixedly held in place against the wall CC of the casing C.

The thermometer T may be attached to an automotive device by the aid of a clamping bracket B provided with adjustable screws 40. This bracket is carried by a curved arm A having an appropriate universal connection UC to permit tilting of the thermometer relative to the arm.

Various changes may be made in details of construction and arrangement of parts without departing from the spirit of the invention or sacrificing any of the advantages thereof inherent therein.

I claim:

1. In a thermometer, a casing, a stator comprising an annular rim mounted within said casing and having an outwardly convex and inwardly concaved strap and a rectilinear strap, said straps being spaced apart transversely of and within said casing and disposed diametrically of said rim and fixedly carried thereby and including alined apertures, a disc within said rim and interposed between said straps and including shaft means journaled in said apertures and having a slot, a heat sensitive spring having one end anchored in said slot and including another end fastened to one of said straps, and a retaining member carried by said casing for holding said stator therein.

2. In a thermometer, a casing embodying an outwardly convex and inwardly concaved backing, a stator comprising an annular rim mounted within said casing and having an outwardly convex and inwardly concaved strap disposed in part against said backing and a rectilinear strap, said straps being spaced apart transversely of and within said casing and disposed diametrically of said rim and fixedly carried thereby and including alined apertures, a disc within said rim and interposed between said straps and including shaft means journaled in said apertures and having a slot, a heat sensitive coiled spring having its inner end anchored in said slot, means anchoring the other end of said spring to one of said straps, and a retaining member carried by said casing for holding said stator therein.

3. In a thermometer, a circular casing embodying an outwardly convex and inwardly concaved backing, a stator comprising an annular rim mounted within said casing and an arcuate outwardly convex and inwardly concaved strap integral with said rim and in part disposed against said backing, and a rectilinear strap secured to said rim in advance of said concave strap, said straps being spaced apart transversely of and within said casing and disposed diametrically of said rim and including alined apertures, a disc within said rim and interposed between said straps and including shaft means journaled in said apertures and having a slot, a heat sensitive coiled spring having its inner end anchored in said slot, spaced means anchoring the other end of said spring to one of said straps, and a retaining member carried by said casing for holding said stator therein.

4. In a thermometer, a circular casing including an outwardly convex and inwardly concave backing, a stator comprising an annular rim mounted within said casing and having an arcuate outwardly convex and inwardly concaved strap integral with said rim and in part disposed against said backing, and a rectilinear strap secured to said rim in advance of said concaved strap, said straps being spaced apart transversely of and within said casing and disposed diametrically of said rim and including alined apertures, a disc within said rim and interposed between said straps and including shaft means journaled in said apertures and having a slot, a heat sensitive coiled spring having its inner end anchored in said slot, spaced means extending from said arcuate strap for anchoring the other end of said spring, and a retaining member carried by said casing for holding said stator therein.

5. In a thermometer, a circular casing including an outwardly convex and inwardly concave backing, a stator comprising an annular rim mounted within said casing and having an arcuate outwardly convex and inwardly concaved strap integral with said rim and in part disposed against said backing, and a rectilinear strap secured to said rim in advance of said concaved strap, said straps being spaced apart transversely of and within said casing and disposed diametrically of said rim and including alined apertures, an indicia carrying interrupted disc within said stator and interposed between said straps and including shaft means journaled in said apertures and having a slot, a heat sensitive coiled spring having its inner end anchored in said slot, means integral with said arcuate strap and extending towards said rectilinear strap for anchoring the other end of said spring, and a circular but rectilinear retaining member carried by said casing for holding said stator therein and including a window for registering displacement of said rotor.

6. In a thermometer, a casing, a stator within said casing comprising an annular rim having on its front face diametrically disposed gaps, a diametrically disposed rear strap integral with said rim and having an aperture, a front strap in alinement with said rear strap and spaced therefrom and having shoulders arranged against the inner curved surface of said rim and including tongues disposed within said gaps and terminal means crimped over and against the rear face of said rim for anchoring said front strap thereto, said front strap being disposed diametrically of said rim and including an aperture in alinement with first mentioned aperture, a rotor within said stator and interposed between said straps and including shaft means journaled in said apertures and having a slot, a heat sensitive coiled spring having its inner end anchored in said slot, means anchoring the other end of said spring to said rear strap, and a retaining member carried by said casing for holding said stator therein.

7. In a thermometer, a casing, a stator within said casing comprising an annular rim having on its front face diametrically disposed gaps, a diametrically disposed arcuate rear strap integral with said rim and having an aperture, a front strap in alinement with said rear strap and spaced therefrom and having shoulders arranged against the inner curved surface of said rim and including reduced tongues disposed within gaps and terminal means crimped over and against the rear face of said rim anchoring said front strap to said rim, said front strap being disposed diametrically of said rim and including an aperture in alinement with said first mentioned aperture, a rotor within said stator and interposed between said straps and including shaft means journaled in said apertures and having a slot, a heat sensitive coiled spring having its inner end anchored in said slot, spaced means integral with said rear strap anchoring the other end of said spring thereto, and a retaining member carried by said casing for holding said stator therein.

8. In a thermometer, a casing, a stator within said casing comprising an annular rim having on its front face diametrically disposed gaps, a diametrically disposed rear strap integral with said rim and having an aperture, a front strap in alinement with said rear strap and spaced therefrom and having shoulders arranged against the inner curved surface of said rim and including tongues disposed within said gaps and terminal means crimped over and against the rear face of said rim for anchoring said front strap to said rim, said front strap being disposed diametrically of said rim and including an aperture in alinement with said first mentioned aperture, an indicia carrying rotor within said stator and interposed between said straps and including shaft means journaled in said apertures and having a slot, a heat sensitive coiled spring having its inner end anchored to said slot, means integral with said rear strap anchoring the other end of said spring thereto, and a retaining member carried by said casing for holding said stator therein and including a window for registering the displacement of said rotor.

9. In a thermometer, a casing, a stator within said casing comprising an annular rim having on its front face diametrically disposed gaps and on its rear face diametrically disposed recesses, a diametrically disposed rear strap integral with said rim and having an aperture, a front strap in alinement with said rear strap and spaced therefrom and having shoulders arranged against the inner curved surface of said rim and including tongues disposed within said gaps and terminal means crimped over and against the rear face of said rim into said recesses for anchoring said front strap to said rim, said front strap being disposed diametrically of said rim and including an aperture in alinement with said first mentioned aperture, an indicia carrying rotor within said stator and interposed between said straps and including shaft means journaled in said apertures and having a slot, a heat sensitive coiled spring having its inner end anchored in said slot, means anchoring the other end of said spring to said rear strap, and a retaining member carried by said casing for holding said stator therein and including means for registering the displacement of said rotor.

10. In a thermometer, a casing, a stator within said casing comprising an annular rim having on its front face diametrically disposed gaps and on its rear face diametrically disposed recesses, a diametrically disposed arcuate rear strap integral with said rim and having an aperture, a front strap in alinement with said rear strap and spaced therefrom and having shoulders arranged against the inner curved surface of said rim and including tongues disposed within said gaps and terminal means crimped over and against the rear face of said rim into said recesses for anchoring said front strap to said rim, said front strap being disposed diametrically of said rim and including an aperture in alinement with said first mentioned aperture, an indicia carrying rotor within said stator and interposed between said straps and including shaft means journaled in said apertures and having a slot, a heat sensitive coiled spring having its inner end anchored in said slot, spaced posts integral with said rear strap anchoring the other end of said spring thereto, and a retaining member carried by said casing for holding said stator therein and including a mirrored surface provided with a transparent portion for registering the displacement of said rotor.

FRANK N. MARIANI.

REFERENCES CITED

The following references are of record in the file of this patent:

UNITED STATES PATENTS

| Number | Name | Date |
|---|---|---|
| 439,239 | Fromm | Oct. 28, 1890 |
| 1,218,167 | Carmody | Mar. 16, 1917 |
| 1,403,228 | Brach | Jan. 10, 1922 |
| 1,528,082 | Schlaich | Mar. 3, 1925 |
| 2,060,427 | Robinson | Nov. 10, 1936 |